Patented July 4, 1939

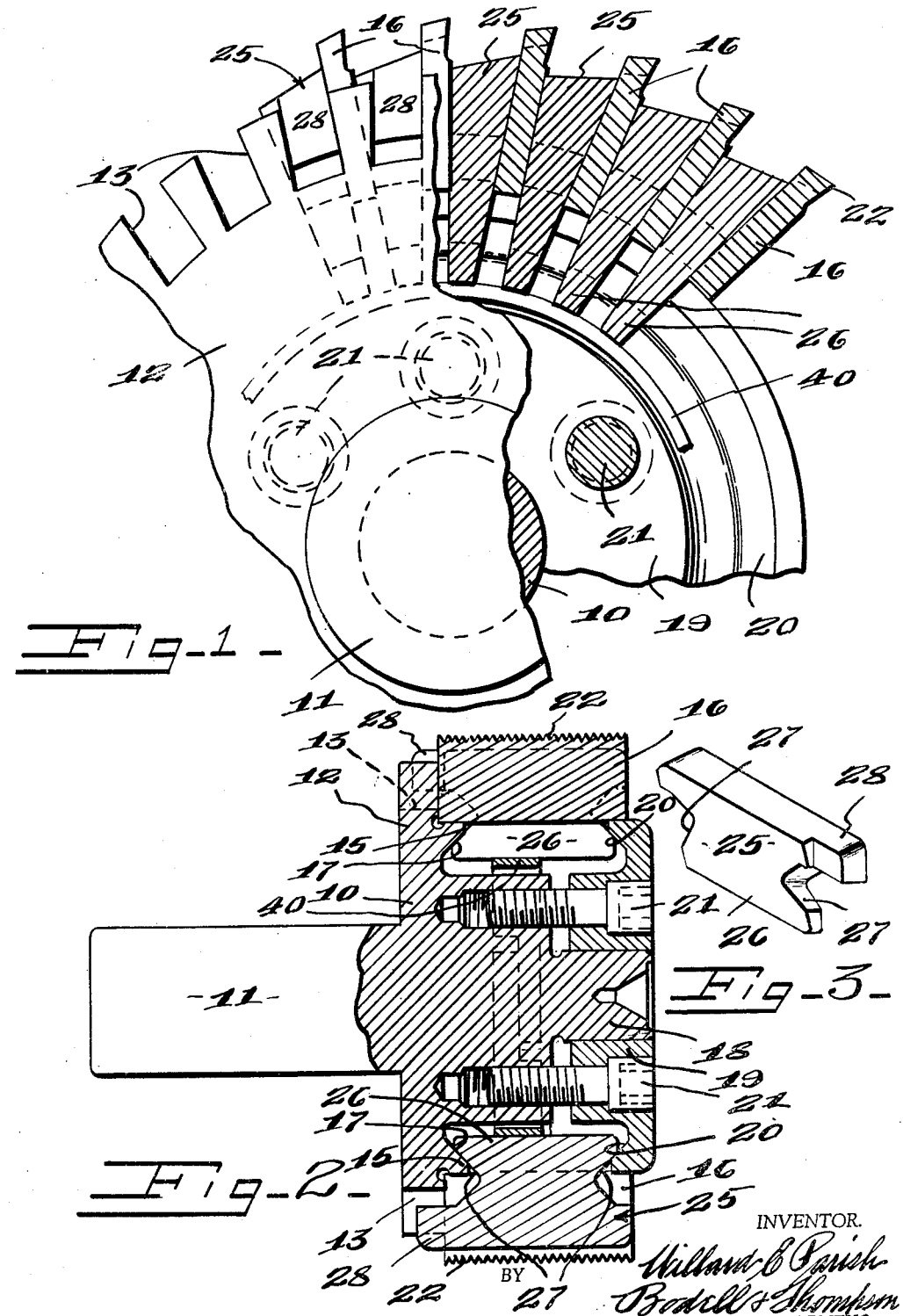

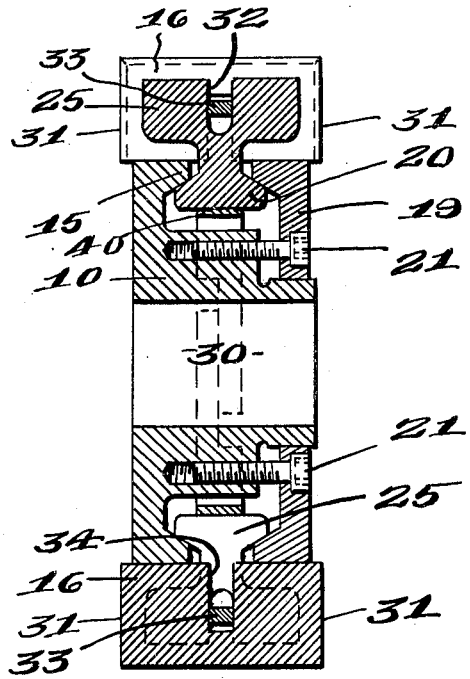
Fig-4-
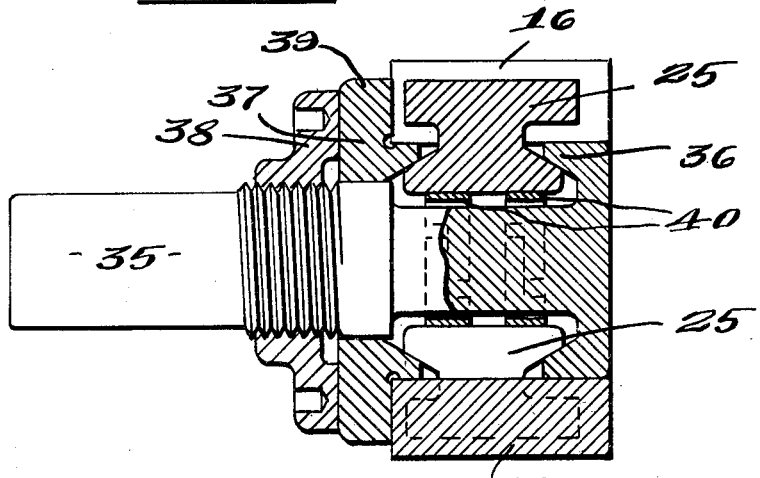
Fig-5-

2,164,620

UNITED STATES PATENT OFFICE 2,164,620

INSERTED TOOTH CUTTER

Willard E. Parish, Syracuse, N. Y.

Application July 29, 1937, Serial No. 156,376

10 Claims. (Cl. 29—105)

This invention relates to inserted tooth milling cutters, that is, cutters for use on milling machines and the like, which are provided with separate removable teeth as distinguished from cutters formed from an integral piece of steel.

The advantages of inserted tooth milling cutters have long been appreciated, particularly in the larger sizes of cutters where it is more economical to make only the teeth or cutting blades from the more costly steels, and the main body portion of the cutter from ordinary steel. However, with constructions heretofore in conventional use the inserted tooth cutter has had certain disadvantages particularly in that considerable time is consumed in adjusting each tooth separately, and because of the space necessarily occupied by the adjusting screws or pins employed to secure each tooth in the body of the cutter, a comparatively few number of teeth can be properly secured to the body of the cutter. It is well appreciated by those familiar with milling operations that it is desirable, in the majority of instances, that the cutter have a comparatively great number of teeth arranged or spaced close together in order to eliminate the chatter marks in the work, and to effect a smoother and more uniform cut.

This invention has as an object an inserted tooth milling cutter embodying a structure by which the teeth or cutting blades may be spaced close together to obtain the maximum number of cutting teeth for a given size cutter, and whereby inserted tooth cutters may be made of comparatively small diameters.

The invention has as a further object a particularly simple and economical structure by which the teeth or cutter blades are conveniently attached to the body of the cutter, and are rigidly secured thereto.

The invention has as a further object a structure as referred to including the provision of means whereby the individual teeth or blades are clamped and secured to the body of the cutter by operation of a single means.

The invention has as a further object a structure by which all of the teeth are arranged a uniform distance from the center of the cutter.

A further and particularly important object of the invention is a structure by which a comparatively large number of teeth or blades may be secured in a cutter of given diameter.

Other objects will be apparent as the description proceeds.

The invention consists in the novel features and in the combinations and constructions hereinafter set forth and claimed.

In describing this invention, reference is had to the accompanying drawings in which like characters designate corresponding parts in all the views.

Figure 1 is an enlarged fragmentary, elevational view looking to the right Figure 2, and being partially in section.

Figure 2 is a cross sectional view of a cutter involving the structure shown in Figure 1.

Figure 3 is a perspective view of one of the wedges employed to secure the teeth to the body of the cutter.

Figure 4 is a view, similar to Figure 2, showing a modification of the structure of Figures 1 and 2, whereby the cutter may be employed as a side mill.

Figure 5 is a cross sectional view of a further modification particularly well adapted for cutters of small diameter.

Referring to the structure disclosed in Figures 1 to 3, the cutter comprises a body 10 mounted on or provided with a driving shank 11. The body 10 is formed with a radially extending flange 12 formed with a plurality of notches 13 arranged in spaced apart relationship about its periphery. The flange 12 is also formed with an annular flange or ledge 15 having a cylindrical periphery forming a support for one end of the teeth or cutter blades 16, and being formed with a surface 17 extending in angular relationship to the axis of the body 12. That is, the surface 17 is of conical formation.

The body further includes a cylindrical end portion 18 of reduced diameter on which is slidably mounted a collar 19. The collar 19 is also formed with a conical surface 20 adjacent its periphery which is complemental with the surface 17. The collar 19 is also formed with a plurality of apertures to receive screws 21 which thread into the body 10 and which afford a means of effecting axial movement of the collar 19 toward the ledge 15.

The teeth or cutting blades 16 are rectangular in cross section and, as shown in Figures 1 and 2, the outer edges are ground to provide a cutting edge 22 which may be of any desired configuration in accordance with the work to be done. For example, as shown in Figure 2, the cutting edge 22 is of serrated form, whereby the cutter may be used to mill internal threads in a piece of work. One end of each blade 16 is supported by the ledge 15, and the opposite end is supported on the periphery of the collar 19.

Wedge members 25 are formed with tapering sides, and are interspersed between the cutting blades 16. The wedges 25 are formed with an inwardly extending portion 26, the ends of which are notched and formed with a bevel surface 27, complemental with the conical surfaces 17, 20, of the ledge 15 and collar 19, and are arranged to be engaged by these members.

In the structure shown in Figures 1 to 3, the wedge members 25 are formed at one end with a laterally extending portion 28 formed with parallel sides, as indicated in Figures 1 and 3, and which extend into the slots 13 of flange 12. In assemblying the teeth to the body, the wedges are arranged between the ledge 15 and collar 19 with the screws 21 loosened and the collar moved axially outwardly. The teeth 16 are then inserted between the wedges 25 and subsequently the screws 21 are tightened. Because of the angular surfaces 17, 20 on the ledge 15 and collar 19 respectively, and the surfaces 27 on the wedge members, the wedge members are caused to move in a direction radially inwardly toward the axis of the body 10, and due to the tapered formation of the wedges they are drawn tightly into engagement with the teeth or cutter blades 16, and the teeth are drawn tightly against the ledge 15 and the periphery of the collar 19.

The laterally extending projections 28 are of such width as to slidably fit the notches 13 with a slight clearance, and in the case of a comparatively large diameter cutter where the wedges and teeth might slip or move relatively to the body 10 under severe cutting conditions, the extensions 28 will engage the sides of the slots 13 and effect a positive drive between the body of the cutter and the teeth.

The structure of my invention may also be employed in the formation of side mills, that is, mills which are formed to cut on their sides as well as on their periphery. In Figure 4, the body 10 is of substantially the same formation with that shown in Figures 1 and 2 except, in Figure 4, the body is provided with a central aperture 30 to permit the cutter to be mounted on an arbor, or the like, and the flange 12 is omitted and accordingly the lateral projection 28 is omitted from the wedge members 25. The wedge members 25 are of less width than the length of the teeth or cutting blades 16, and the blades extend outwardly a short distance beyond the side of the body 10 and the collar 19, and are provided with end cutting edges 31. The wedge members 25 are also formed with a slot 32 arranged centrally and extending inwardly from the outer edge of the wedge, and in which is arranged a ring member 33. The cutter blades 16 are formed with a centrally arranged slot 34 to receive the ring 33. This structure is assembled by arranging the wedge members 25 within the ring 33 and prearranging the wedge members between the ledge 15 and collar 19. Subsequently, the individual teeth 16 are inserted in between the wedge members 25 and the screws 21 tightened. The function of the ring 33 is to prevent relative endwise movement between the cutting blades 16 and the wedge members 25.

Where it is desired to form the inserted tooth cutter of comparatively small diameter, the structure disclosed in Figure 5 may be employed. In this instance, the shank 35 of the cutter is formed at its outer end with a ledge 36 comparable to the ledge 15 in the structure heretofore discussed. A collar 37 is slidably mounted upon the shank and is in general cross sectional form similar to the collar 19 in Figures 1 to 4. The collar 37 is moved axially on the shank toward the ledge 36 by means of a collar 38 threaded on the shank 35. The collar 37 may be formed with a peripheral flange 39 to act as a stop or guide for the adjacent end of the cutter blade 16.

Preferably means is provided for yieldingly urging the wedge members 25 radially outwardly. As here shown, this means comprises one or more expansible ring members 40 arranged within the annular series of wedge members and acting to urge the same outwardly, and to maintain the angular surfaces 27 in engagement with the surfaces 17, 20, of the body and collar of the holder. When the movable collar is released, the expansible members 40 urge the wedge members outwardly permitting the blades 16 to be conveniently removed and replaced.

It will be observed that with the structure of my invention the cutting teeth may be quickly and conveniently removed from the body of the cutter, a new set of teeth inserted and secured in place. Also, the clamping structure is such that the teeth can be spaced close together and cutters of comparatively small diameter can be made with inserted teeth.

What I claim is:

1. An inserted tooth cutter comprising a body member, a plurality of cutting teeth arranged about the periphery of the body, said teeth being arranged in circumferentially spaced apart relation, a wedge member arranged in the space between adjacent teeth and engaging the confronting sides of said teeth, said wedge members having limited movement in both directions circumferentially of the body, means operable to move said wedges into engagement with said teeth to detachably clamp the same to the body, and means cooperable with said teeth and wedges to retain said teeth from axial movement relative to said wedges.

2. An inserted tooth cutter comprising a body, a plurality of cutting teeth arranged about the periphery of the body, said teeth being arranged in circumferentially spaced apart relation, a wedge member arranged in the space between adjacent teeth and engaging the confronting sides of said teeth, said wedge members being formed with slots extending radially inwardly from the outer surface of said wedge members, a ring member arranged in said slot, each of said teeth being provided with a slot to receive said ring, and means operable to move said wedge members into engagement with said teeth to detachably clamp the same to the body.

3. An inserted tooth cutter comprising a body member, a plurality of cutting teeth arranged about the periphery of the body member, said teeth being arranged in circumferentially spaced apart relation, a wedge member arranged in the space between adjacent teeth and engaging the confronting sides of said teeth, means yieldingly urging said wedge members radially outwardly, and a single means operable to move said wedge members into engagement with said teeth to detachably clamp the same to the body.

4. An inserted tooth cutter comprising a body provided with a radial flange formed with a plurality of slots, a collar mounted on the body and being movable axially thereof toward and from said flange, said flange being formed with a circular ledge extending toward said collar, a plurality of detachable teeth supported at like ends by said ledge and at their opposite ends by said collar, a wedge member arranged between adjacent teeth and engaging the confronting sides thereof, said wedge members having lateral projections extending into said slots in the flange and having inwardly extending projections cooperable with said flange and collar upon axial movement of the collar toward the flange to effect movement of said wedges into engagement with said teeth to detachably clamp the same to said flange and collar, and means operable to effect such axial movement of the collar.

5. An inserted tooth cutter comprising a body member provided with spaced apart collars, a plurality of teeth arranged about the periphery of said collars and being supported at their ends by said collars in spaced apart relationship to said body, a wedge member arranged between adjacent teeth and engaging the confronting sides thereof and having a portion arranged between said collars and extending radially inwardly toward said body, the ends of said inner portions of the wedges and the confronting sides of said collars being formed with cam surfaces and being cooperable upon movement of one of said collars toward the other to effect radial inward movement of said wedges, and said wedges being operable during such movement to clamp the teeth against the periphery of said collars, and means operable to effect axial movement of one of said collars.

6. An inserted tooth cutter comprising a body member provided with spaced apart collars, a plurality of teeth arranged about the periphery of said collars and being supported at their ends by said collars in spaced apart relationship to said body, one of said collars being formed with a radial flange to engage like ends of said teeth, a wedge member arranged between adjacent teeth and engaging the confronting sides thereof and having a portion arranged between said collars and extending radially inwardly toward said body, the ends of said inner portions of the wedges and the confronting sides of said collars being formed with cam surfaces and being cooperable upon movement of one of said collars toward the other to effect radial inward movement of said wedges, and said wedges being operable during such movement to clamp the teeth against the periphery of said collars, and means operable to effect axial movement of one of said collars.

7. An inserted tooth cutter comprising a body member provided with spaced apart collars, a plurality of cutting teeth arranged about the periphery of said collars and being supported at their ends by said collars in spaced apart relationship to said body, one of said collars being formed with a radial flange extending outwardly from its tooth engaging periphery, and said flange being formed with a plurality of notches, a wedge member arranged between adjacent teeth and engaging the confronting sides thereof and having a lateral portion extending into one of said notches, and an inner portion arranged between said collars and extending radially inwardly toward said body, the ends of said inner portions of the wedges and the confronting sides of said collars being formed with cam surfaces and being cooperable to effect radial inward movement of said wedges upon axial movement of one of said collars toward the other, said wedges being cooperable with said teeth during such inward radial movement to clamp the teeth against the periphery of said collars, and means operable to effect such axial movement of one of the collars.

8. An inserted tooth cutter comprising a body member provided with spaced apart collars, a plurality of teeth arranged about the periphery of said collars and being supported at their ends by said collars in spaced apart relationship to said body, a wedge member arranged between adjacent teeth and engaging the confronting sides thereof and having a portion arranged between said collars and extending radially inwardly toward said body, the ends of said inner portions of the wedges and the confronting sides of said collars being formed with cam surfaces and being cooperable upon movement of one of said collars toward the other to effect radial inward movement of said wedges, and said wedges being operable during such movement to clamp the teeth against the periphery of said collars, means operable to effect axial movement of one of said collars, and spring means arranged intermediate said collars and between the inner edges of said wedges and the body to yieldingly urge said wedges radially outwardly.

9. An inserted tooth cutter comprising a body member provided with spaced apart collars, one of said collars being fixed to the body and the other of said collars being movable axially of the body, a plurality of cutting teeth arranged about the periphery of said collars and being supported at their ends by said collars in spaced apart relationship to the body said teeth being formed with flat side surfaces extending in parallel relationship, a wedge member arranged between adjacent teeth and engaging the confronting sides thereof and having a portion extending radially inwardly between said collars, the ends of said inner portions of the wedges and the confronting sides of the collars being formed with complemental cam surfaces and being cooperable upon movement of said movable collar toward said fixed collar to effect radial inward movement of the wedges, said wedges being operable during such movement to clamp the teeth against the periphery of said collars, and means operable to effect axial movement of said movable collar.

10. An inserted tooth cutter comprising a body, a plurality of cutting teeth arranged in an annular series about the axis of the body, a wedge member arranged between adjacent teeth and engaging the confronting sides thereof, said wedge members being radially movable throughout their entire length relative to the body, each of said teeth and wedge members being free to move circumferentially of the body, and means cooperable with said body and wedges to rigidly clamp said teeth to the body.

WILLARD E. PARISH.